(12) United States Patent
Purohit et al.

(10) Patent No.: US 12,459,796 B2
(45) Date of Patent: Nov. 4, 2025

(54) INDUSTRIAL VEHICLE DISTANCE AND RANGE MEASUREMENT DEVICE CALIBRATION

(71) Applicant: Crown Equipment Corporation, New Bremen, OH (US)

(72) Inventors: Karan Purohit, Auckland (NZ); Timothy Fanselow, Auckland (NZ); Sebastian Theos, Vaterstetten (DE)

(73) Assignee: Crown Equipment Corporation, New Bremen, OH (US)

( * ) Notice: Subject to any disclaimer, the term of this patent is extended or adjusted under 35 U.S.C. 154(b) by 684 days.

(21) Appl. No.: 17/305,482

(22) Filed: Jul. 8, 2021

(65) Prior Publication Data

US 2022/0009759 A1  Jan. 13, 2022

Related U.S. Application Data

(60) Provisional application No. 63/049,171, filed on Jul. 8, 2020.

(51) Int. Cl.
*B66F 9/075* (2006.01)
*B66F 9/06* (2006.01)
*G01S 7/497* (2006.01)
*G01S 17/42* (2006.01)

(52) U.S. Cl.
CPC ........... *B66F 9/0755* (2013.01); *B66F 9/063* (2013.01); *G01S 7/497* (2013.01); *G01S 17/42* (2013.01)

(58) Field of Classification Search
CPC ........ B66F 9/0755; B66F 9/063; G01S 7/497; G01S 17/42; G01S 7/4972; G01S 7/52004; G01S 15/08; G01S 15/931; G01S 17/08; G01S 17/931

USPC ............................................................. 701/50
See application file for complete search history.

(56) References Cited

U.S. PATENT DOCUMENTS

| 10,139,708 | B2* | 11/2018 | Stein ...................... G03B 17/12 |
| 2006/0290920 | A1 | 12/2006 | Kämpchen et al. |
| 2010/0076708 | A1 | 3/2010 | Hukkeri et al. |
| 2011/0205340 | A1 | 8/2011 | Garcia et al. |

(Continued)

FOREIGN PATENT DOCUMENTS

| CN | 103688226 A | 3/2014 |
| CN | 105717499 A | 6/2016 |
| CN | 111033316 A | 4/2020 |

(Continued)

OTHER PUBLICATIONS

Baharlou, Simin; International Preliminary Report on Patentability dated Jan. 19, 2023; International Application No. PCT/US2021/040865; The International Bureau of WIPO; Geneva, Switzerland.

(Continued)

*Primary Examiner* — Tung S Lau
(74) *Attorney, Agent, or Firm* — Stevens & Showalter LLP

(57) ABSTRACT

Processes and systems for calibrating a distance and range measurement device coupled to an industrial vehicle are disclosed. The calibration requires no physical movement of the distance and range measurement device. Instead, actual measurements from the device are used with nominal detection zones and nominal measurements to create modified detection zones to detect objects within the modified detection zones.

7 Claims, 9 Drawing Sheets

(56) References Cited

U.S. PATENT DOCUMENTS

2017/0302909 A1   10/2017  Finn et al.
2018/0314268 A1*  11/2018  Tan .......................... B64D 1/18

FOREIGN PATENT DOCUMENTS

| EP | 2154650 A1 | | 2/2010 | |
|---|---|---|---|---|
| FR | 3027654 A1 | * | 4/2016 | ............ G01S 17/32 |
| WO | WO 2006/082503 A1 | * | 8/2006 | ............... B60Q 1/24 |

OTHER PUBLICATIONS

Invitation to Pay Additional Fees and Partial International Search Result dated Oct. 27, 2021; International Application No. PCT/US2021/040865; European Patent Office; Rijswijk, Netherlands.
International Search Report and Written Opinion of the International Searching Authority dated Dec. 21, 2021; International Application No. PCT/US2021/040865; European Patent Office; Rijswijk, Netherlands.
Theibing, Nikolaus; Communication pursuant to Article 94(3) EPC dated Dec. 6, 2024; European Application No. 21755858.4; European Patent Office; Munich, Germany.
Fan, Youpeng; Notification of the First Office Action dated Jun. 28, 2025; Chinese Application No. 202180045019.6; China National Intellectual Property Administration; Beijing, China.
Larracilla, Edgar Flores; First Office Action dated Aug. 13, 2025; Mexican Application No. MX/a/2023/000409; Mexican Institute of Industrial Property; Mexico City, Mexico.

* cited by examiner

INDUSTRIAL VEHICLE DISTANCE AND RANGE MEASUREMENT DEVICE CALIBRATION

CROSS REFERENCE TO RELATED APPLICATIONS

This application claims the benefit of U.S. Provisional Patent Application Ser. No. 63/049,171, filed Jul. 8, 2020, entitled "INDUSTRIAL VEHICLE DISTANCE AND RANGE MEASUREMENT DEVICE CALIBRATION", the disclosure of which is hereby incorporated by reference.

BACKGROUND

Various aspects of the present disclosure relate generally to industrial vehicles and specifically to calibrating distance and range measurement devices (e.g., laser scanners, 3-D cameras, light detection and ranging (LIDAR) devices, etc.) coupled to the industrial vehicle.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via a mobile wireless transceiver. For instance, in order to move items about the operator's facility, workers often utilize industrial vehicles, including for example, forklift trucks, hand and motor driven pallet trucks, etc. The wireless transceiver is used as an interface to the management system to direct workers in their tasks, e.g., by instructing workers where and/or how to pick, pack, put away, move, stage, process or otherwise manipulate the items within the operator's facility.

The wireless transceiver may also be used in conjunction with a suitable input device to scan, sense or otherwise read tags, labels or other identifiers to track the movement of designated items within the facility. The input devices that are coupled to the industrial vehicle should be calibrated, including a mechanical orientation so the input devices may scan specified viewing areas. This mechanical orientation can compensate for tolerances in building the industrial vehicles and allow for higher accuracy in readings from the input device.

BRIEF SUMMARY

According to aspects of the present disclosure, a process for calibrating a distance and range measurement device coupled to an industrial vehicle comprises determining a nominal detection zone that is an area that is smaller than an area of a scan zone associated with a distance and range measurement device coupled to an industrial vehicle. Further, the nominal detection zone includes a nominal height above ground to end the nominal detection zone. A device height is determined to be a height that the distance and range measurement device is above the ground. A first measurement is taken of an emission from the distance and range measurement device at a first yaw angle with respect to a roll axis of the distance and range measurement device within the scan zone. Further, a second measurement is taken of an emission from the distance and range measurement device at a second yaw angle with respect to the roll axis of the distance and range measurement device. The second yaw angle is in an opposite direction from the roll axis of the distance and range measurement device and within an angular tolerance of an absolute value of the first yaw angle. A third measurement is taken of the emission from the distance and range measurement device at a pitch angle with respect to the roll axis of the distance and range measurement device. A modified detection zone is created based on the nominal height, the device height, the first measurement, the second measurement, and the third measurement.

According to further aspects of the present disclosure, a process for calibrating a distance and range measurement device coupled to an industrial vehicle comprises determining a nominal detection zone that includes an area that is smaller than an area of a scan zone associated with a distance and range measurement device coupled to an industrial vehicle. A first measurement is taken of an emission from the distance and range measurement device at a first yaw angle with respect to a roll axis of the distance and range measurement device within the scan zone. Further, a second measurement is taken of an emission from the distance and range measurement device at a second yaw angle with respect to the roll axis of the distance and range measurement device. The second yaw angle is in an opposite direction from the roll axis of the distance and range measurement device and within an angular tolerance of an absolute value of the first yaw angle. Based on the first measurement, the second measurement, a height of the distance and range measurement device, and the nominal detection zone, a modified detection zone is created.

According to still further aspects of the present disclosure, a process for calibrating a distance and range measurement device coupled to an industrial vehicle comprises determining a nominal height above ground to end a nominal detection zone and determining a device height of the distance and range measurement device above the ground. Further, a measurement is taken of an emission from the distance and range measurement device at a pitch angle. A modified detection zone is created based on the nominal height, the device height, and the measurement.

DETAILED DESCRIPTION

According to various aspects of the present disclosure, systems and processes for calibrating a distance and range measurement device (e.g., laser, scanner, 3-D camera, light detection and ranging (LIDAR) device, ultrasonic device, etc.) coupled to an industrial vehicle are disclosed. Traditional distance and range measurement device calibration processes require a separate laptop with an adapter that couples to a sensor of the distance and range measurement device, special software on the laptop, and a special alignment gauge. However, through the calibration processes and systems described herein, the distance and range measurement device may be calibrated without a need for any of those items or a need for a technician or any other resource to mechanically reposition the distance and range measurement device. Instead, a calibration process may be performed by altering what is determined to be a detection zone of the distance and range measurement device.

Example Industrial Environment Layout

Figure 1:
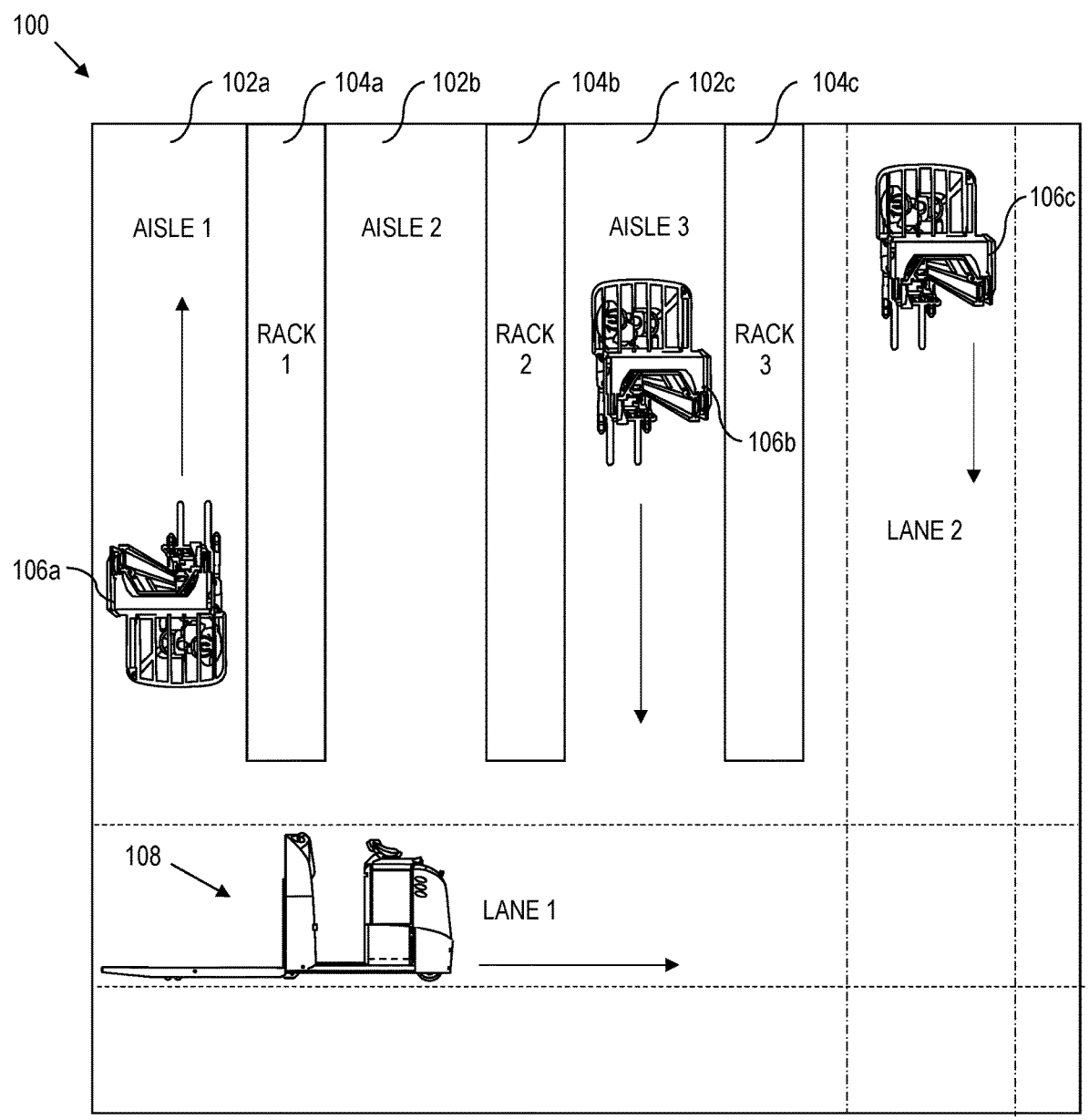
FIG. 1 is an example layout of an industrial environment, according to various aspects of the present disclosure.

Referring now to FIG. 1 an example of an industrial environment (e.g., warehouse, supply yard, loading dock, manufacturing facility, retail space, etc.) layout 100 is shown. In a typical stock picking operation, an operator of an industrial vehicle fills orders from available stock items that are located in storage areas provided down one or more aisles within the industrial environment. In this example industrial environment layout 100, there are three aisles 102a, 102b, 102c (collectively 102), which are separated by three racks 104a, 104b, 104c (collectively 104).

A rack is a structure that can be used to stock and store various items such as consumer products or materials and can vary in both size and structure. Examples of racks include, but are not limited to selective pallet racks, drive-in racks, drive-through racks, flow racks, gravity racks, and pushback racks. Racks may also have multiple vertical tiers to expand storage capacity.

During a typical stock picking operation, an operator may drive an industrial vehicle 106 to a first location where item(s) on a first order are to be picked (e.g., aisle 1). In a pick process, the operator retrieves the ordered stock item(s) from their associated storage area(s) (e.g., racks) and places the picked stock on a pallet, collection cage, other support structure carried by the industrial vehicle, or on the industrial vehicle itself. The operator then advances the industrial vehicle to the next location where subsequent item(s) are to be picked. The above process is repeated until all stock items on the order have been picked. Alternatively, the operator retrieves a packaged item such as a pallet, crate, box, container, or other like item with the industrial vehicle 106 and repeats the process until all packages have been retrieved and moved to a new location.

The operator may be required to repeat the pick process several hundred times per order. Moreover, the operator may be required to pick numerous orders per shift. As such, the operator may be required to spend a considerable amount of time relocating and repositioning the industrial vehicle, which reduces the time available for the operator to spend picking stock.

Further, it is not uncommon for multiple operators, each controlling an industrial vehicle, to pick orders simultaneously. For example, three traditional forklift trucks 106a-c (e.g., counterbalance forklifts, reach trucks, order pickers, stock pickers, stackers, etc.) and one pallet truck 108 (e.g., a low-level order picker, a quick pick remote truck, a center-control pallet truck, etc.) are shown.

According to aspects of the present disclosure, methods and systems are provided to mitigate collisions between industrial vehicles and other entities (e.g., other industrial vehicles, pedestrians, building structure, obstacles, etc.). For example, various factors may affect a likelihood of a collision (e.g., size and structure of the racks), which may prevent an operator of an industrial vehicle 106c to visually see an operator of a different industrial vehicle 108, which may result in a collision between the industrial vehicles.

Moreover, some industrial vehicles may have remote control capabilities. For example, a remote-control system for the industrial vehicle may comprise a wearable wireless remote-control device that is donned by the operator interacting with the industrial vehicle. The wearable wireless remote-control device may include a wireless transmitter and a travel control communicably coupled to a wireless transmitter and actuation of the travel control causes the wireless transmitter to wirelessly transmit a travel request to the industrial vehicle.

Further, industrial environments may have varying traffic rules between different areas of the industrial environment. For example, a maximum allowed speed limit in an aisle may be different than a maximum allowed speed limit in a lane.

System Overview

Figure 2:
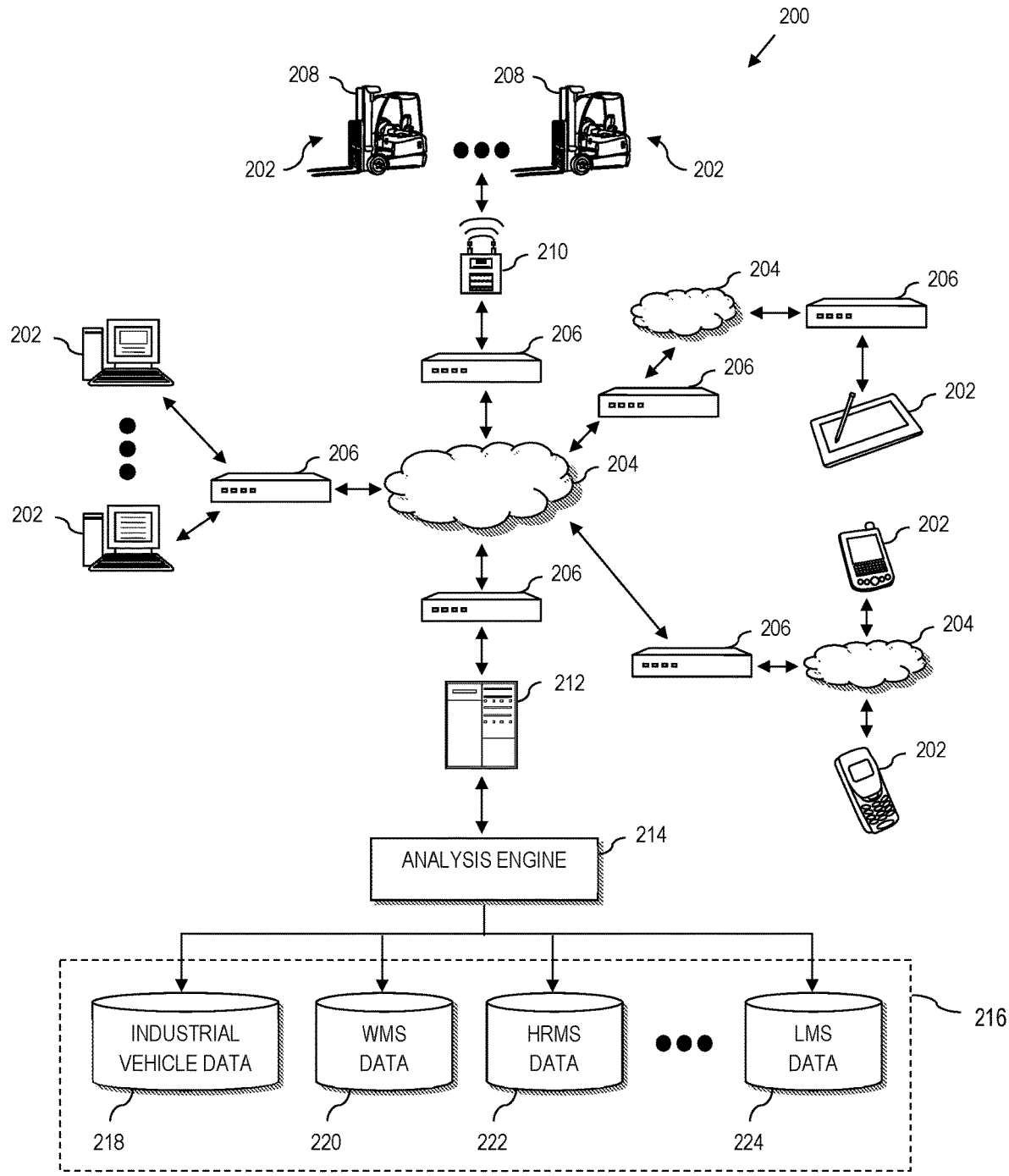
FIG. 2 is a flow diagram of a network system, according to aspects of the present disclosure.

Referring now to the drawings and in particular to FIG. 2, a general diagram of a system 200 is illustrated according to various aspects of the present disclosure. The illustrated system 200 is a special purpose (particular) computing environment that includes a plurality of hardware processing devices (designated generally by the reference 202) that are linked together by one or more network(s) (designated generally by the reference 204).

The network(s) 204 provides communications links between the various processing devices 202 and may be supported by networking components 206 that interconnect the processing devices 202, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 204 may comprise connections using one or more intranets, extranets, local area networks (LAN), wide area networks (WAN), wireless networks (Wi-Fi), the Internet, including the world wide web, cellular and/or other arrangements for enabling communication between the processing devices 202, in either real time or otherwise (e.g., via time shifting, batch processing, etc.).

A processing device 202 can be implemented as a server, personal computer, laptop computer, netbook computer, purpose-driven appliance, special purpose computing device and/or other device capable of communicating over the network 204. Other types of processing devices 202 include for example, personal data assistant (PDA) processors, palm computers, cellular devices including cellular mobile telephones and smart telephones, tablet computers, an electronic control unit (ECU), a display of the industrial vehicle, etc.

Still further, a processing device 202 is provided on one or more industrial vehicles 208 such as a forklift truck, reach truck, stock picker, automated guided vehicle, turret truck, tow tractor, rider pallet truck, walkie stacker truck, quick pick remote truck, etc. In the example configuration illustrated, the industrial vehicles 208 wirelessly communicate through one or more access points 210 to a corresponding networking component 206, which serves as a connection to the network 204. Alternatively, the industrial vehicles 208 can be equipped with Wi-Fi, cellular or other suitable technology that allows the processing device 202 on the industrial vehicle 208 to communicate directly with a remote device (e.g., over the networks 204).

The illustrated system 200 also includes a processing device implemented as a server 212 (e.g., a web server, file server, and/or other processing device) that supports an analysis engine 214 and corresponding data sources (collectively identified as data sources 216). The analysis engine 214 and data sources 216 provide domain-level resources to the industrial vehicles 208. Moreover, the data sources 216 store data related to activities of the industrial vehicles 208.

In an exemplary implementation, the data sources 216 include a collection of databases that store various types of information related to an operation (e.g., an industrial environment, distribution center, retail store, manufacturer, etc.). However, these data sources 216 need not be co-located. In the illustrative example, the data sources 216 include databases that tie processes executing for the benefit of the enterprise, from multiple, different domains. In the illustrated example, data sources 216 include an industrial vehicle information database 218 (supporting processes executing in an industrial vehicle operation domain), a warehouse management system (WMS) 220 (supporting processes executing in WMS domain that relate to movement and tracking of goods within the operating environment), a human resources management system (HRMS) 222 (supporting processes executing in an HRMS domain), a geo-feature management system 224 (supporting processes that utilize environmental-based location tracking data of industrial vehicles in a geo-domain), etc. The above list is not exhaustive and is intended to be illustrative only.

Still further, the industrial vehicles 208 may include a short range, direct communication with electronic badges that can be remote, but in relatively close proximity (by way of example, 15-20 meters) to a corresponding industrial vehicle 208. Electronic badges can also be positioned on machines, fixtures, equipment, other objects, an industrial vehicle operator, combinations thereof, etc. Electronic badges are discussed in greater detail in U.S. patent application Ser. No. 15/685,163 by Philip W. Swift entitled INDUSTRIAL ELECTRONIC BADGE filed Aug. 24, 2017, the entirety of which is hereby incorporated by reference.

In certain illustrative implementations, the industrial vehicles 208 themselves can communicate directly with each other via electronic badge communicator technology, e.g., via a short-range direct communication link, thus forming a mesh network, or temporary mesh network.

Industrial Vehicle

As noted above, in certain contexts and roles, a processing device 202 is provided on an industrial vehicle 208. Here, the processing device 202 is a special purpose, particular computer, such as a device that mounts to or is otherwise integrated with the industrial vehicle 208. The processing device 202 includes a processor coupled to memory to carry out instructions. However, the execution environment of the processing device 202 is further tied into the industrial vehicle 208 making it a particular machine different from a general-purpose computer.

For instance, an example processing device 202 on an industrial vehicle is a mobile asset information linking device (see information linking device 38) as set out in U.S. Pat. No. 8,060,400 to Wellman, the disclosure of which is incorporated by reference in its entirety. In certain illustrative implementations, the processing device 202 also communicates with components of the corresponding industrial vehicle 208 (e.g., via a vehicle network bus (e.g., CAN bus (controller area network bus)), short range wireless technology (e.g., via Bluetooth or other suitable technologies), or other wired connection, examples of which are set out further in U.S. Pat. No. 8,060,400, already incorporated by reference.

Figure 3:
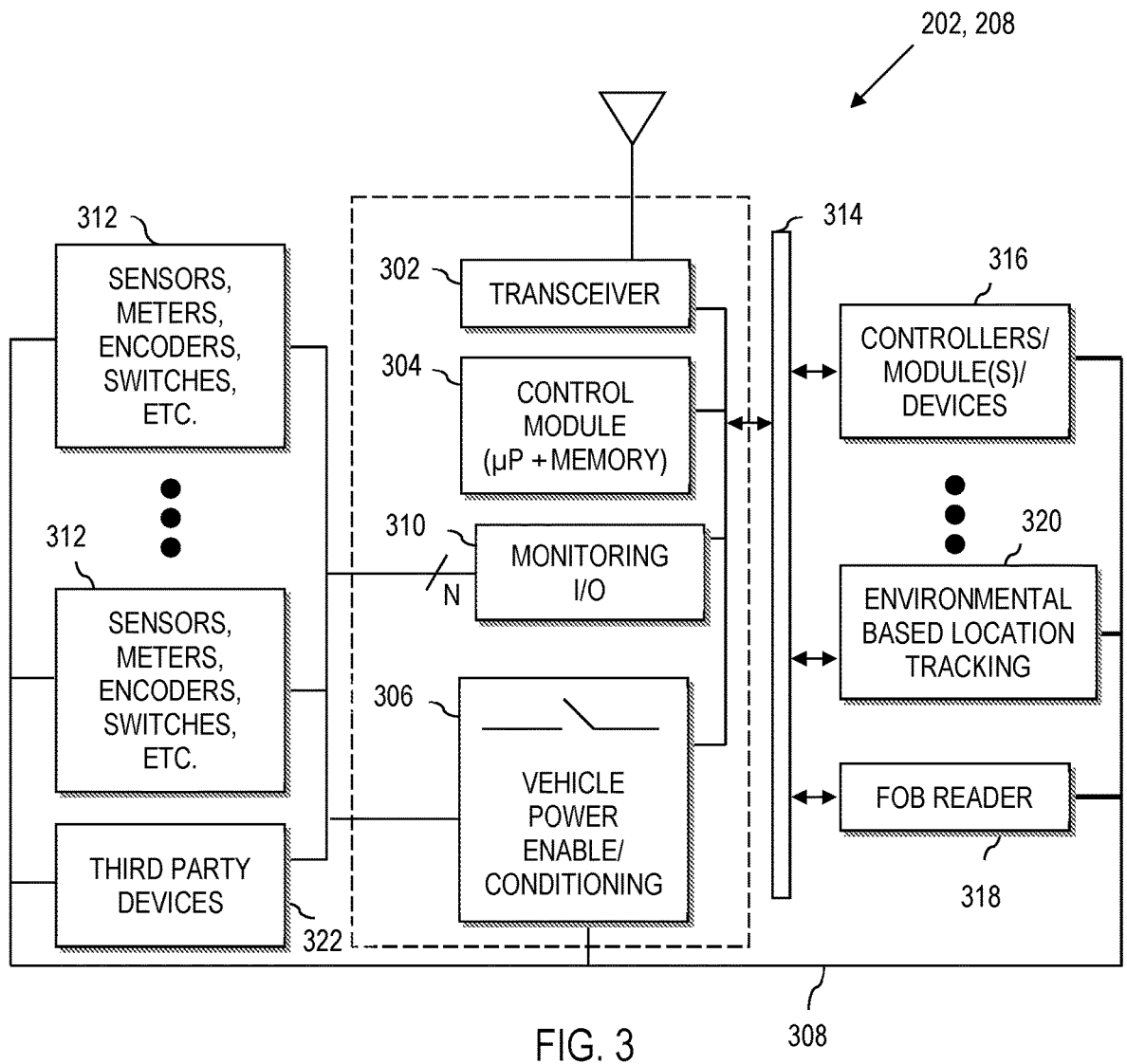
FIG. 3 is a hardware system diagram that can be used in an industrial vehicle, according to aspects of the present disclosure.

Referring to FIG. 3, a processing device 202 is implemented as an information linking device that comprises the necessary circuitry to implement wireless communication, data and information processing, and wired (and optionally wireless) communication to components of the industrial vehicle 208. As a few illustrative examples, the processing device 202 includes a transceiver 302 for wireless communication, which is capable of both transmitting and receiving signals. Although a single transceiver 302 is illustrated for convenience, in practice, one or more wireless communication technologies may be provided. For instance, the transceiver 302 may be able to communicate with a remote server, e.g., server 212 and hence, interact with the analysis engine 214 of FIG. 2, via 802.11.xx across the access points 210 of FIG. 2. The transceiver 302 may also optionally support other wireless communication, such as cellular, Bluetooth, infrared (IR) or any other technology or combination of technologies. For instance, using a cellular to IP (Internet protocol) bridge, the transceiver 302 may be able to use a cellular signal to communicate directly with a remote server, e.g., a manufacturer server. The transceiver 302 may also communicate with a wireless remote-control device that controls the industrial vehicle 208. The remote-control device may be controlled by an industrial vehicle operator, or by the system 200.

The processing device 202 also comprises a control module 304, having a processor coupled to memory for implementing computer instructions. Additionally, the control module 304 implements processes such as operator log on, pre-use inspection checklists, data monitoring and other features, examples of which are described more fully in U.S. Pat. No. 8,060,400, already incorporated by reference herein.

The processing device 202 further includes vehicle power enabling circuitry 306 to selectively enable or disable the industrial vehicle 208. In certain implementations, the vehicle power enabling circuitry 306 can partially enable the industrial vehicle 208 for operation, or fully enable the industrial vehicle 208 for operation, e.g., depending upon proper operator login. For instance, the industrial vehicle power enabling circuitry 306 can provide selective power to components via power line 308. Various functions of the industrial vehicle 208 can be controlled by the vehicle power enabling circuitry 306 (e.g., in conjunction with the control module 304) such as traction control, steering control, brake control, drive motors, etc.

Still further, the processing device 202 includes a monitoring input/output (I/O) module 310 to communicate via wired or wireless connection to peripheral devices mounted to or otherwise on the industrial vehicle, such as sensors, meters, encoders, switches, etc. (collectively represented by reference numeral 312).

The processing device 202 is coupled to and/or communicates with other industrial vehicle system components via a suitable industrial vehicle network system 314, e.g., a vehicle network bus. The industrial vehicle network system 314 is any wired or wireless network, bus or other communications capability that allows electronic components of the industrial vehicle 208 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy.

As will be described more fully herein, utilization of the industrial vehicle network system 314 enables seamless integration of the components of the processing device 202 on the industrial vehicle 208 into the native electronics including controllers of the industrial vehicle 208. Moreover, the monitoring I/O module 310 can bridge any electronic peripheral devices 312 to the industrial vehicle network system 314. For instance, as illustrated, the processing device 202 connects with, understands and is capable of communication with native vehicle components, such as controllers, modules, devices, bus enabled sensors, displays, lights, light bars, sound generating devices, headsets, microphones, haptic devices, etc. (collectively referred to by reference 316).

The processing device 202 can also communicate with a fob 318 (or keypad, card reader or any other device) for receiving operator log in identification. Still further, the processing device 202 can include a display and/or other features to provide desired processing capability.

According to yet further aspects of the present disclosure, an environmental based location tracking system 320 may be provided on the industrial vehicle 208, which can communicate across the industrial vehicle network system 314. The environmental based location tracking system 320 enables the industrial vehicle 208 to be spatially aware of its location within the industrial environment. The environmental based location tracking system 320 may comprise a local awareness system that utilizes markers, including RFID (radio-frequency identification), beacons, lights, or other external devices to allow spatial awareness within the industrial environment. The environmental based location tracking system 320 may use one or more of a global positioning system (GPS), or triangulation system to determine position. The environmental based location tracking system 320 may also use knowledge read from vehicle sensors, encoders, accelerometers, etc., or other system that allows location to be determined.

As a further example, the environmental based location tracking system 320 may include a transponder, and the position of the industrial vehicle may be triangulated within the industrial environment. Yet further, the environmental based location tracking system 320 may use combinations of the above and/or other technologies to determine the current (real-time) position of the industrial vehicle. As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The processing device 202 may also be connected to other devices, e.g., third party devices 322 such as RFID scanners, displays, meters, weight sensors, fork load sensors, or other devices.

Scan Field and Detection Zone

Figure 4:
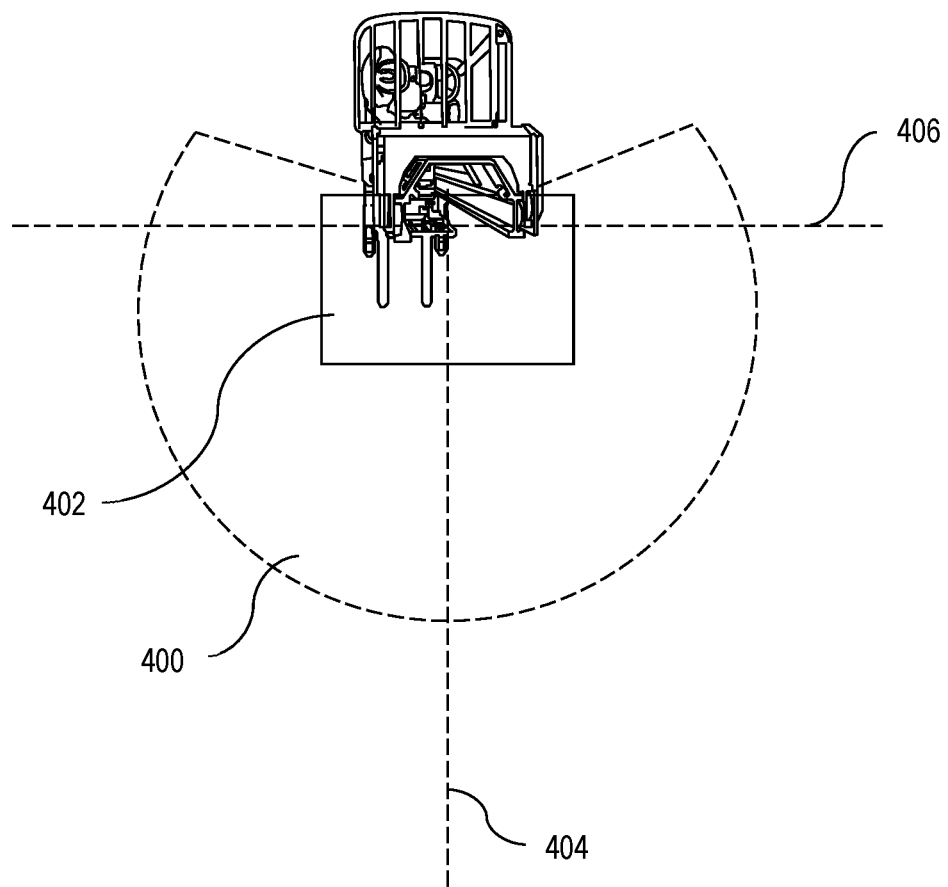
FIG. 4 is a top-down view illustrating a scan zone of a distance and range measurement device mounted to an industrial vehicle, according to aspects of the present disclosure.

Turning now to FIG. 4, a top-down view of a scan field 400 of a distance and range measurement device coupled to an industrial vehicle, when the distance and range measurement device is properly calibrated, is shown. As illustrated, the scan field 400 is two-hundred-and-seventy degrees) (270°) of a circle. However, the scan field 400 may be any shape. A detection zone 402 is a zone that is part of the scan field 400 that is used to detect objects and markings of interest to the industrial vehicle. Note that the scan field 400 is larger than the detection zone 402. As shown, the detection zone 402 is rectangular in shape when the distance and range measurement device is calibrated properly, but may be any desired shape. An x-axis 404 (also called a roll axis) and y-axis (also called a pitch axis) 406 are shown for references below.

Processes for calibrating the distance and range measurement device without physically moving the distance and range measurement device are discussed herein. Specifically, processes for calibrating a roll of the distance and range measurement device and calibrating a pitch of the distance and range measurement device.

Pitch Calibration

Figure 5:
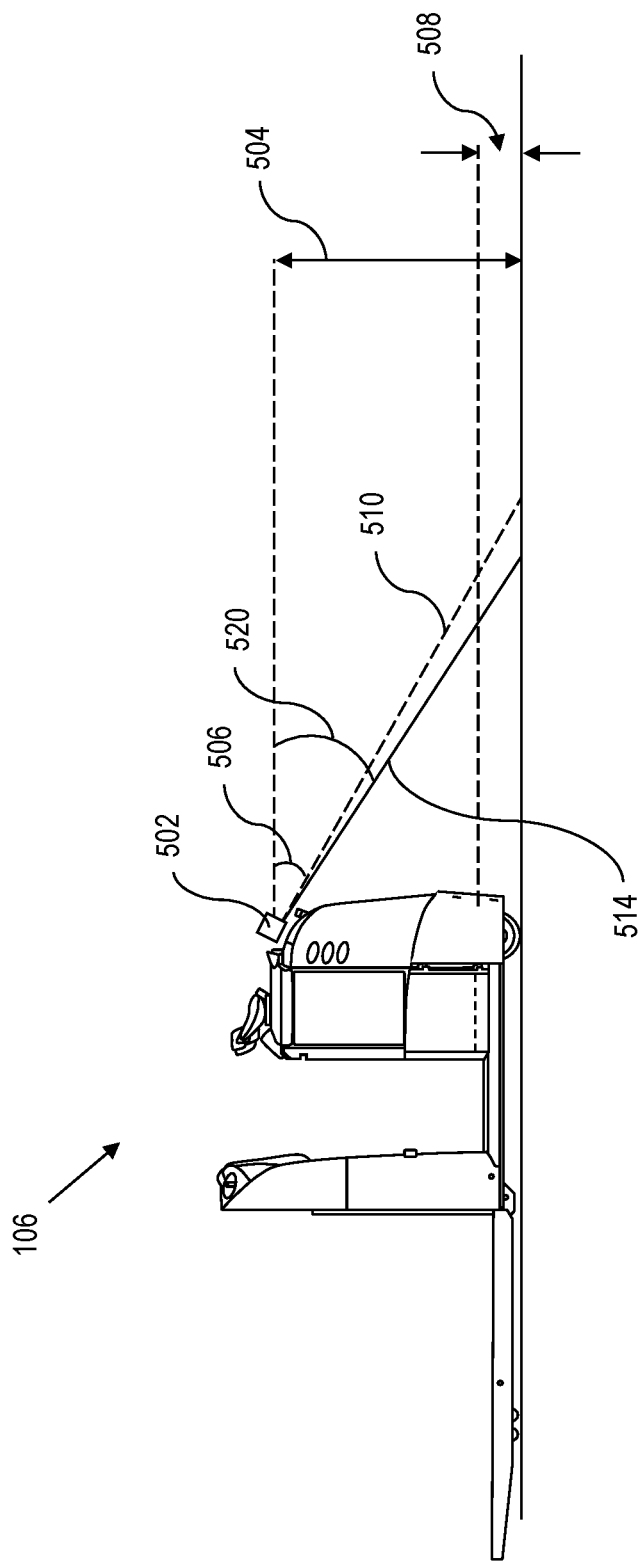
FIG. 5 is a side view of a scan zone of a distance and range measurement device mounted to an industrial vehicle in relation to calibrating a pitch angle of the distance and range measurement device, according to aspects of the present disclosure.

FIG. 5 illustrates a distance and range measurement device 502 coupled to an industrial vehicle 106 at a height 504. The nominal detection zone 402, see FIG. 4, ends above the ground at a zone height 508 when a pitch angle 506 of the distance and range measurement device 502 is properly calibrated (i.e., the distance and range measurement device 502 is at a nominal pitch angle 506). Thus, a nominal pitch angle 506 of the distance and range measurement device 502 is known. Further, a nominal emission length 510 of an emission from the distance and range measurement device 502 can be derived using height 504 of the distance and range measurement device 502 and the nominal pitch angle 506 (the nominal emission length 510 is equal to the height 504 divided by the sine of the nominal pitch angle 506).

The distance and range measurement device 502 determines if an object is present in the detection zone by measuring an emission from the distance and range measurement device 502. If the emission measured is equal to or greater than a nominal zone length 510 then there is no object in the detection zone 402 for that emission. However, an object in the detection zone 402 will cause a length 514 of the emission to be shorter than the nominal emission length 510, so if the emission measured is less than a nominal zone length 512 then there is an object in the detection zone 402.

Normally, the goal of calibrating the pitch angle of the distance and range measurement device 502 is to ensure that the detection zone 402 ends at the zone height 508 above the floor/ground. If the pitch angle results in an emission closer to the industrial vehicle 106 (i.e., the pitch angle 506 is larger than the nominal pitch angle), then the detection zone height would seem to be lower than the nominal zone height and smaller objects may be detected in the detection zone. Normally, those smaller objects are ignored (i.e., not detected) because they are of little consequence regarding the industrial vehicle. On the other hand, if the pitch angle results in an emission farther away from the industrial vehicle 106 (i.e., the pitch angle 506 is less than the nominal pitch angle), then the resulting zone height 508 would seem to be higher than the nominal zone height and objects that should be detected in the detection zone may not be detected.

To determine if the pitch angle 506 is properly calibrated, the distance and range measurement device 502 emits an emission and a measurement is taken of the emission length 514. The yaw angle of the emission may be any angle, but for discussion purposes herein a yaw angle of zero degrees (i.e., in line with the x-axis 404 in the top-down view of FIG. 4) is used. If the measurement is within a pitch tolerance from the nominal emission length, then the pitch angle is properly calibrated. However, if the measurement is outside the pitch tolerance from the nominal emission length, then the pitch angle is not properly calibrated.

If the pitch angle of the distance and range measurement device 502 is not properly calibrated, then instead of physically adjusting the distance and range measurement device 502, the detection zone 402 may be automatically shifted. Specifically, more or less of the emission length 514 can be used when setting the detection zone 402. To determine how the detection zone 402 should be shifted, an actual pitch angle 520 of the distance and range measurement device 502 is determined. In some embodiments, the actual pitch angle 520 is determined by taking the arcsine of the result of the height 504 of the distance and range measurement device 502 divided by the emission length measurement. For example, if the height of the distance and range measurement device 502 is 1.2 meters, and the measurement of the emission length is 2.4 meters, then the result of dividing the height by the measurement is 0.5. The arcsine of 0.5 is thirty degrees, so in this example, the actual pitch angle would be thirty degrees.

Using the actual pitch angle 520, the emission can be modified to function as a portion of the detection zone 402. As discussed above, the detection zone 402 ends at the height 508 above the floor/ground. The emission length 514 can be augmented by an offset amount equal to the nominal detection zone height, i.e., the height 508, divided by the sine of the actual pitch angle 520. Subtracting the offset amount from the emission length 514 gives the augmented length of the detection zone 402.

Using the equivalents above, the augmented length of the detection zone 402 can be determined by subtracting the offset from the measured length of the emission 514. Further, the offset is determined by the nominal detection zone height, i.e. the height 508, divided by the sine of the actual pitch angle 520. Thus, the detection zone actually measured may be reshaped to compensate for errors in pitch angle of the distance and range measurement device by applying the offset as set out above.

Roll Calibration

Figure 6:
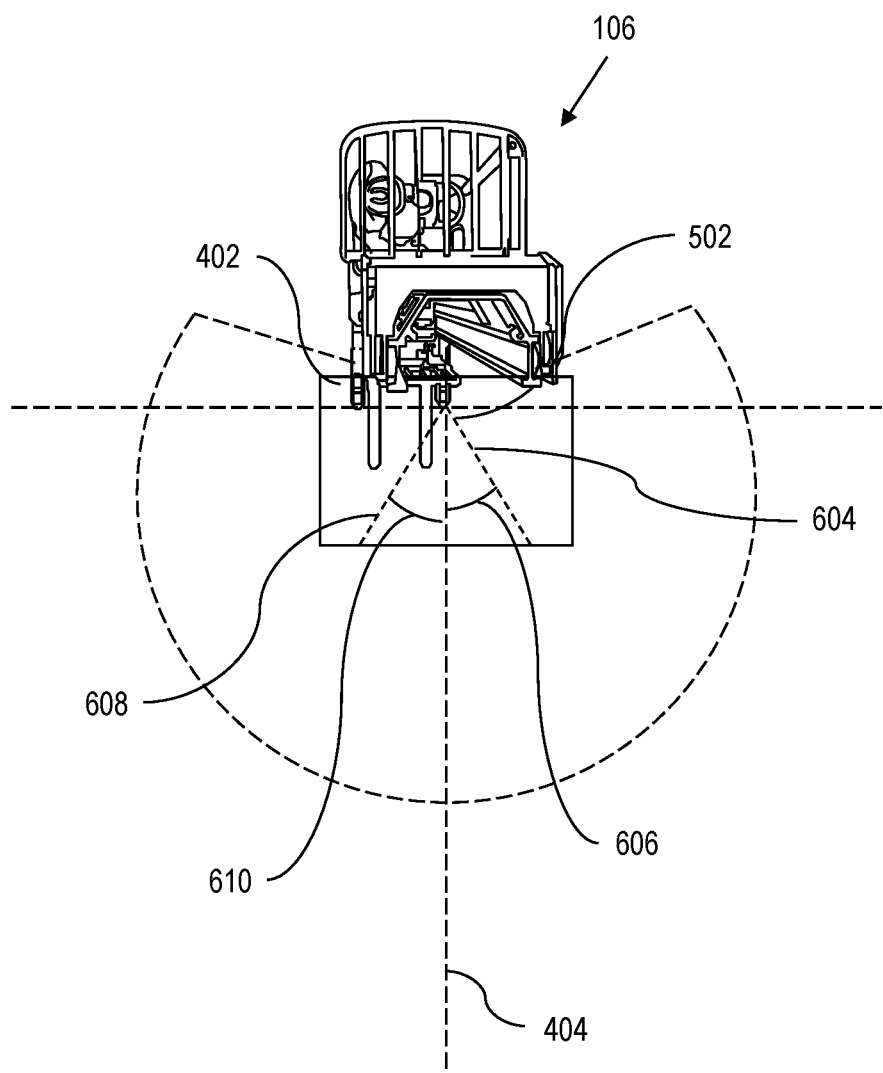
FIG. 6 is a top-down view of a scan zone and nominal detection zone of a distance and range measurement device mounted to an industrial vehicle in relation to calibrating a roll angle of the distance and range measurement device, according to aspects of the present disclosure.

FIG. 6 illustrates a nominal detection zone 402 based on a distance and range measurement device 502 coupled to an industrial vehicle 106. If the distance and range measurement device 502 is calibrated properly (and the industrial vehicle 106 is on a flat floor or flat ground), then a first measurement 604 measured by the distance and range measurement device 502 at a first yaw angle 606 with respect to the x-axis 406 should be within a roll tolerance of a second measurement 608 measured by the distance and range measurement device 502 at a second yaw angle 610 with respect to the x-axis 404. The second yaw angle 610 is in an opposite direction of the first yaw angle 606, but an absolute value of the first yaw angle 606 is within an angular tolerance of an absolute value of the second yaw angle 610. For example, if the first yaw angle 606 is negative forty-five degrees (−45°), then the second yaw angle 610 should be within an angular tolerance of positive forty-five degrees (+45°). If the roll tolerance is zero when calibrated, then the first measurement 604 would equal the second measurement 608. Thus, if the first measurement 604 is within the roll tolerance of the second measurement 608, then the roll of the distance and range measurement device 502 is properly calibrated. However, if the first measurement 604 is not within the roll tolerance of the second measurement 608, then the roll of the distance and range measurement device 502 is not properly calibrated and needs to be corrected.

Figure 7:
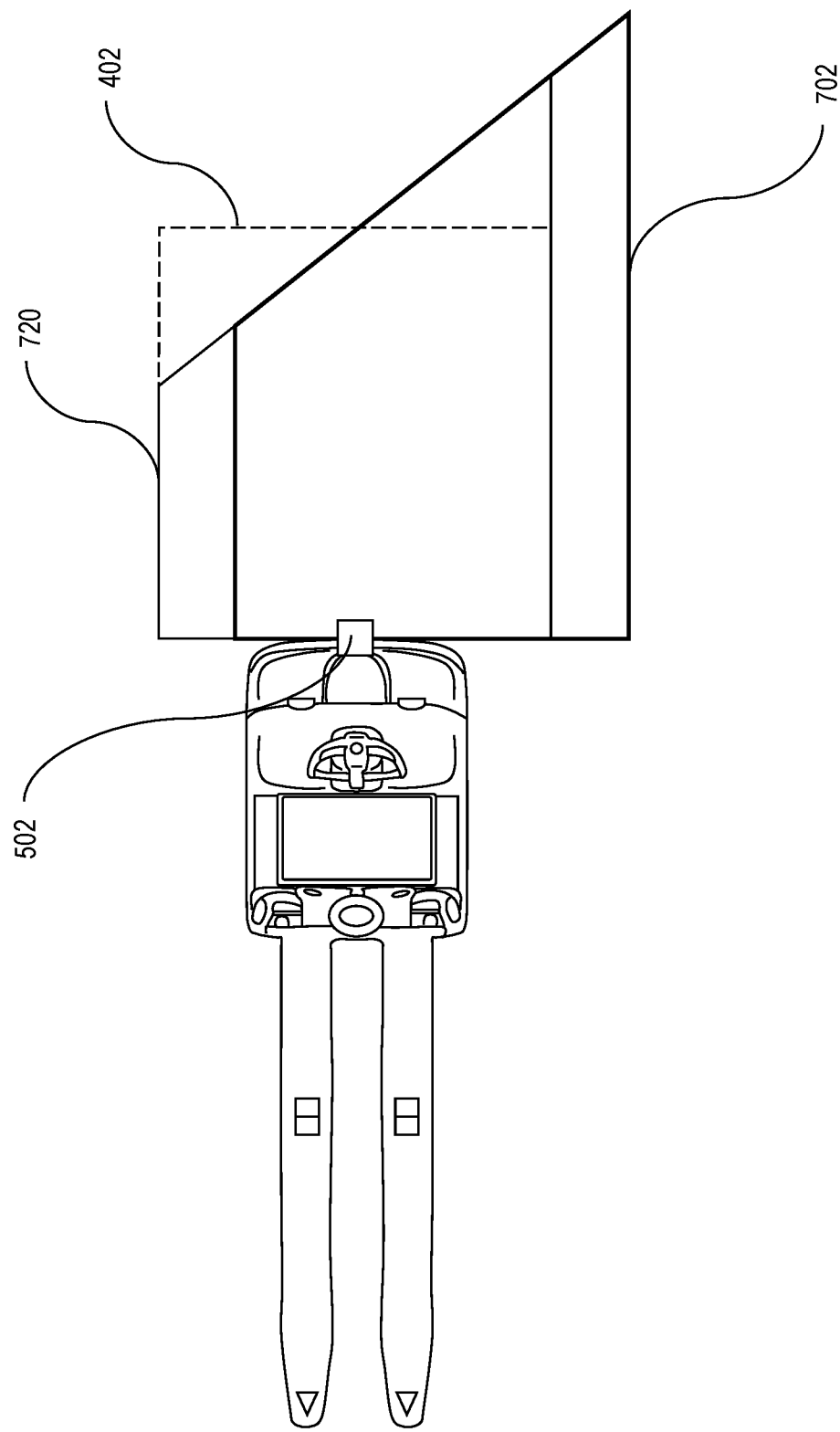
FIG. 7 is a top-down view of a nominal detection zone, actual detection zone, and modified detection zone of a distance and range measurement device mounted to an industrial vehicle in relation to calibrating a roll angle of the distance and range measurement device, according to aspects of the present disclosure.
Figure 8:
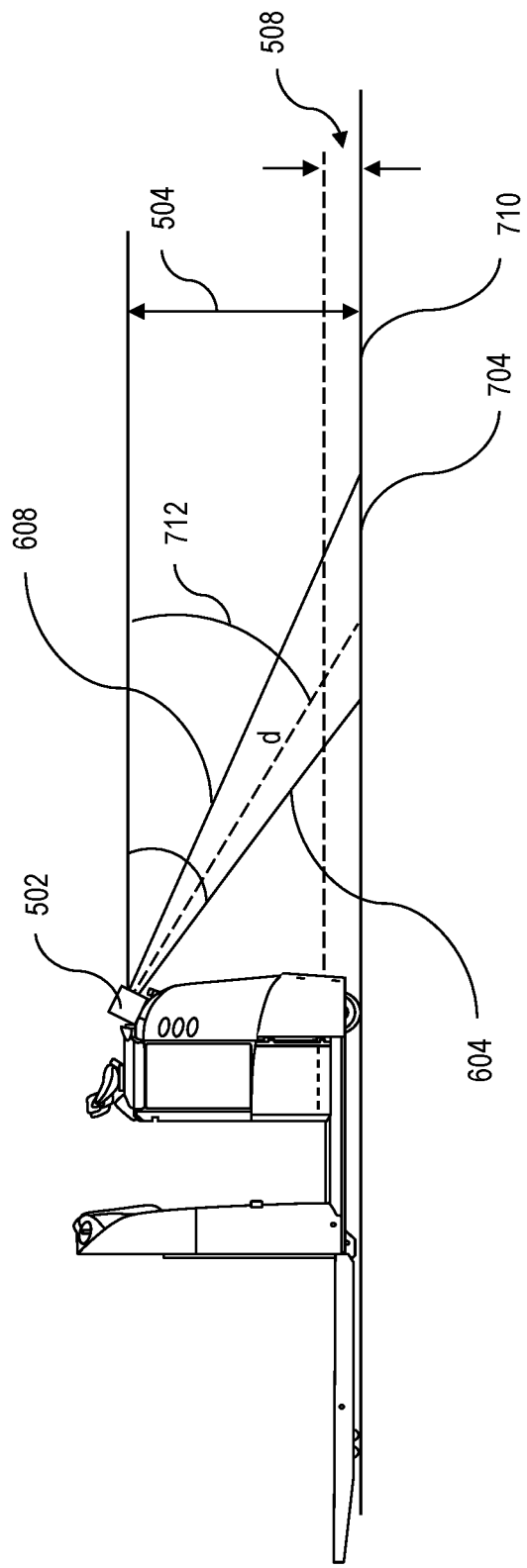
FIG. 8 is a side view of a scan zone and nominal detection zone of a distance and range measurement device mounted to an industrial vehicle in relation to calibrating a roll angle of the distance and range measurement device, according to aspects of the present disclosure.

FIG. 7 illustrates a measured detection zone 702 when the roll angle of the distance and range measurement device 502 is not properly calibrated. In FIG. 7, the first measurement 604 at the first yaw angle 606 is shorter than the second measurement 608 at the second yaw angle 610. Therefore, the roll angle of the distance and range measurement device 502 is incorrect. Further, it should be noted that the measured detection zone 702 is shifted to the right of a nominal detection zone 402 (also see FIG. 6).

Similar to the pitch calibration discussed above, the roll angle may be calibrated without physically moving the distance and range measurement device 502. However, instead of subtracting (or adding) an offset (as in the pitch calibration above), the measurements of the emissions of the distance and range measurement device 502 are multiplied by a zone ratio.

With continued reference to FIGS. 5-7, FIG. 8 illustrates the measured detection zone 702 of FIG. 7 from a side view instead of the top view of FIG. 7. The distance and range measurement device 502 is coupled to the industrial vehicle 106 at a height 504, and that height 504 is the same for the first measurement 604 and the second measurement 608. The zone ratio may be determined using the first measurement 604 and the second measurement 608.

A line 704 joins an emission resulting in the first measurement 604 and an emission resulting in the second measurement 608 where the emissions hit the floor 710 and represents an intersection of an emission plane with the floor 710. A nominal angle 712 illustrates where the emission plane hits the floor 710 when the roll angle is properly calibrated. As discussed above, an offset can be determined as equal to the nominal detection zone height divided by the sine of the pitch angle. This offset can be used to determine a new measurement for the detection zone at that angle. The new measurement for the nominal angle is the measurement of the emission at that angle multiplied by one minus the ratio of the offset divided by the height of the distance and range measurement device 502. The zone ratio is defined as the new measurement divided by the nominal measurement of the emission at the nominal angle. Therefore, for each angle (i.e., each emission) through a sweep of the zone, actual measurements of the emissions should be multiplied by the zone ratio to get measurements for the actual detection zone. This results in a "shift" of the detection zone to a modified detection zone (i.e., a reshaped detection zone) 720 shown in FIG. 7.

Pitch and Roll Calibration

Figure 9:
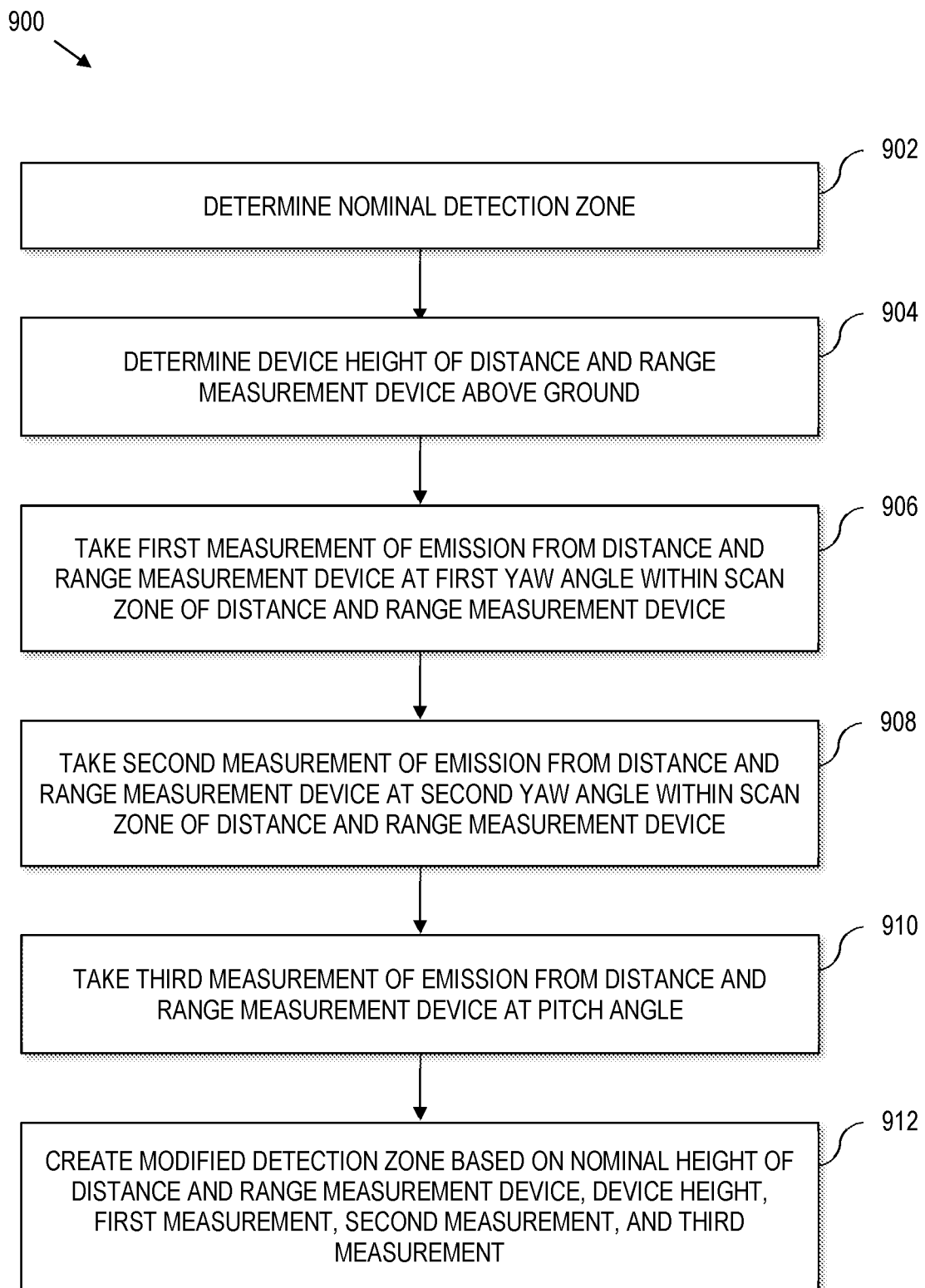
FIG. 9 is a flow chart illustrating a process for calibrating a distance and range measurement device coupled to an industrial vehicle, according to various aspects of the present disclosure.

FIG. 9 is a flow chart illustrating a process 900 for calibrating a distance and range measurement device coupled to an industrial vehicle. The process 900 reflects the discussion above in reference to FIGS. 1-8. The process may be performed by a processor on the industrial vehicle itself or a processor as part of the distance and range measurement device.

At 902, a nominal detection zone is determined. The nominal detection zone includes an area that is smaller than an area of a scan zone associated with the distance and range measurement device coupled to an industrial vehicle. Further, the nominal detection zone ends at a nominal height above the ground, as discussed above. The nominal detection zone may be determined by including a definition of the nominal detection zone in memory on the industrial vehicle and a processor reading the memory. Different types of industrial vehicles may include different nominal detection zones. For example, one type of industrial vehicle may change a width of the nominal detection zone based on a load that the industrial vehicle is carrying. As another example, a scissor-lift industrial vehicle may need a longer nominal detection zone (i.e., looks further ahead of the vehicle). Moreover, a layout of a warehouse may affect a size of the nominal detection zone. For example, a width of the nominal detection zone may be narrower in warehouses with narrower aisles.

At 904, a device height of the distance and range measurement device above the ground is determined. As discussed above, the distance and range measurement device is coupled to an industrial vehicle, so the device height should be easily determined based on the industrial vehicle type. For example, if the distance and range measurement device is coupled to a quick-pick remote truck at one meter off the ground, then the device height is one meter. While other factors (e.g., machining tolerances, wear on tire tread, etc.) may affect the device height, those factors are negligible (e.g., millimeters compared to meters) when calibrating the distance and range measurement device.

At 906, a first measurement of an emission from the distance and range measurement device at a first yaw angle with respect to a roll axis of the distance and range measurement device is taken. Further, the emission from the distance and range measurement device at the first yaw angle is within the scan zone. For example, the emission can be at a yaw angle of negative forty-five degrees (−45°) from the roll axis. As another example, the emission can be at a yaw angle of positive twenty degrees (+20°) from the roll axis.

At 908, a second measurement of an emission from the distance and range measurement device at a second yaw angle with respect to a roll axis of the distance and range measurement device is taken. As with the first measurement, the emission from the distance and range measurement device at the second yaw angle is within the scan zone. Moreover, the second yaw angle is in an opposite direction from the roll axis and within an angular tolerance of the first yaw angle. For example, if the first yaw angle is negative forty-five degrees (−45°) from the roll axis, then the second yaw angle is positive forty-five degrees (+45°) from the roll axis. As another example, if the first yaw angle is positive twenty degrees (+20°) from the roll axis, then the second yaw angle is negative twenty degrees (−20°) from the roll axis. Also, two different angles may be used for the two yaw angles (i.e., two yaw angles whose absolute values are not within the angular tolerance). One of the measurements should then be scaled before comparing below. For example, the first measurement should be scaled by a cosine of the first yaw angle divided by a cosine of the second yaw angle. On the other hand, the second measurement may be scaled by a cosine of the second yaw angle divided by a cosine of the first yaw angle. Thus, if the first yaw angle is forty-five degrees and the second yaw angle is negative twenty degrees, then the first measurement is scaled by 0.707/0.94=0.752. Note that the result is the same for an example if the first yaw angle is forty-five degrees and the second yaw angle is positive twenty degrees.

At 910, a third measurement of the emission from the distance and range measurement device at a pitch angle with respect to the roll axis of the distance and range measurement device. In some embodiments, the third measurement is the same as the first measurement. In other embodiments, the third measurement is taken at a different time than the first measurement.

At 912, a modified detection zone is created based on the nominal height, the device height, the first measurement, the second measurement, and the third measurement. For example, using the first measurement and the second measurement, the device height, and the nominal height of the detection zone, the nominal detection zone can be modified by a zone ratio to compensate for issues with the roll angle of the distance and range measurement device, as discussed above. Further, using the third measurement, the nominal height of the detection zone, and the height of the distance and range measurement device, the nominal detection zone can be modified by an offset to compensate for issues with the pitch angle of the distance and range measurement device, as discussed above.

In some embodiments, the detection zone is modified to compensate for the pitch angle first, then to compensate for the roll angle second. In other embodiments, the detection zone is modified to compensate for the roll angle first, then to compensate for the pitch angle second. In various embodiments, the detection zone is modified to compensate for the roll angle and for the pitch angle simultaneously. Further, the measurements may be taken in any order. For example, in some embodiments, the third measurement is taken, then the detection zone is modified to compensate for errors in pitch calibration (i.e., the pitch angle is not within a pitch tolerance of a nominal pitch angle). Then the first and second measurements are taken, and the detection zone is modified to compensate for errors in roll calibration (i.e., the roll angle is not within a roll tolerance of a nominal roll angle). Other orders are also possible.

Moreover, the zone ratio may be one, and the offset may be zero if there are no errors in pitch calibration and roll calibration. Thus, the modified zone would be the nominal zone.

The calibration systems and processes described herein eliminate a need for adjustable mounts for the distance and range measurement device, which should reduce types of variables that lead to errors in calibration.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the present disclosure. Aspects of the disclosure were chosen and described in order to best explain the principles of the disclosed embodiments and the practical application, and to enable others of ordinary skill in the art to understand the various embodiments with various modifications as are suited to the particular use contemplated.

What is claimed is:

1. A process for calibrating a distance and range measurement device coupled to an industrial vehicle, the process comprising:
   determining a nominal detection zone that ends above ground at a zone height, wherein the nominal detection zone is a detection zone when the distance and range measurement device is properly calibrated;
   determining a device height of the distance and range measurement device above the ground;
   taking a measurement of an emission from the distance and range measurement device at a pitch angle;
   reshaping the nominal detection zone to create a modified detection zone based on the zone height, the device height, and the measurement; and
   using the modified detection zone to detect objects of interest to the industrial vehicle, wherein when an object is detected below the zone height, the object is ignored.

2. The process of claim 1, wherein taking a measurement of an emission from the distance and range measurement device at a pitch angle comprises taking a measurement of the emission from the distance and range measurement device at a yaw angle of zero degrees with reference to a roll axis of the distance and range measurement device.

3. The process of claim 1, wherein taking a measurement of an emission from the distance and range measurement device at a pitch angle comprises taking a measurement of the emission from the distance and range measurement device at a yaw angle other than zero degrees with reference to a roll axis of the distance and range measurement device.

4. The process of claim 1, wherein reshaping the nominal detection zone to create a modified detection zone based on the nominal height, the device height, and the measurement comprises:
   determining that the pitch angle is correct by determining that the measurement is within a pitch tolerance of a length of the nominal detection zone; and
   using the nominal detection zone as the modified detection zone if the pitch angle is correct.

5. The process of claim 1, wherein reshaping the nominal detection zone to create a modified detection zone based on the nominal height, the device height, and the measurement comprises:
   determining that the pitch angle is incorrect by determining that the measurement is outside a pitch tolerance of a length of the nominal detection zone; and
   creating the modified detection zone by scaling the measurement based on the nominal height and the device height.

6. The process of claim 5, wherein reshaping the nominal detection zone to create the modified detection zone by scaling the measurement based on the nominal height and the device height comprises multiplying the measurement by a difference between one and a ratio of the nominal height to the device height.

7. The process of claim 5, wherein reshaping the nominal detection zone to create the modified detection zone by scaling the measurement based on the nominal height and the device height comprises creating the modified detection zone by scaling several measurements based on the nominal height and the device height.

* * * * *